Patented Nov. 29, 1949

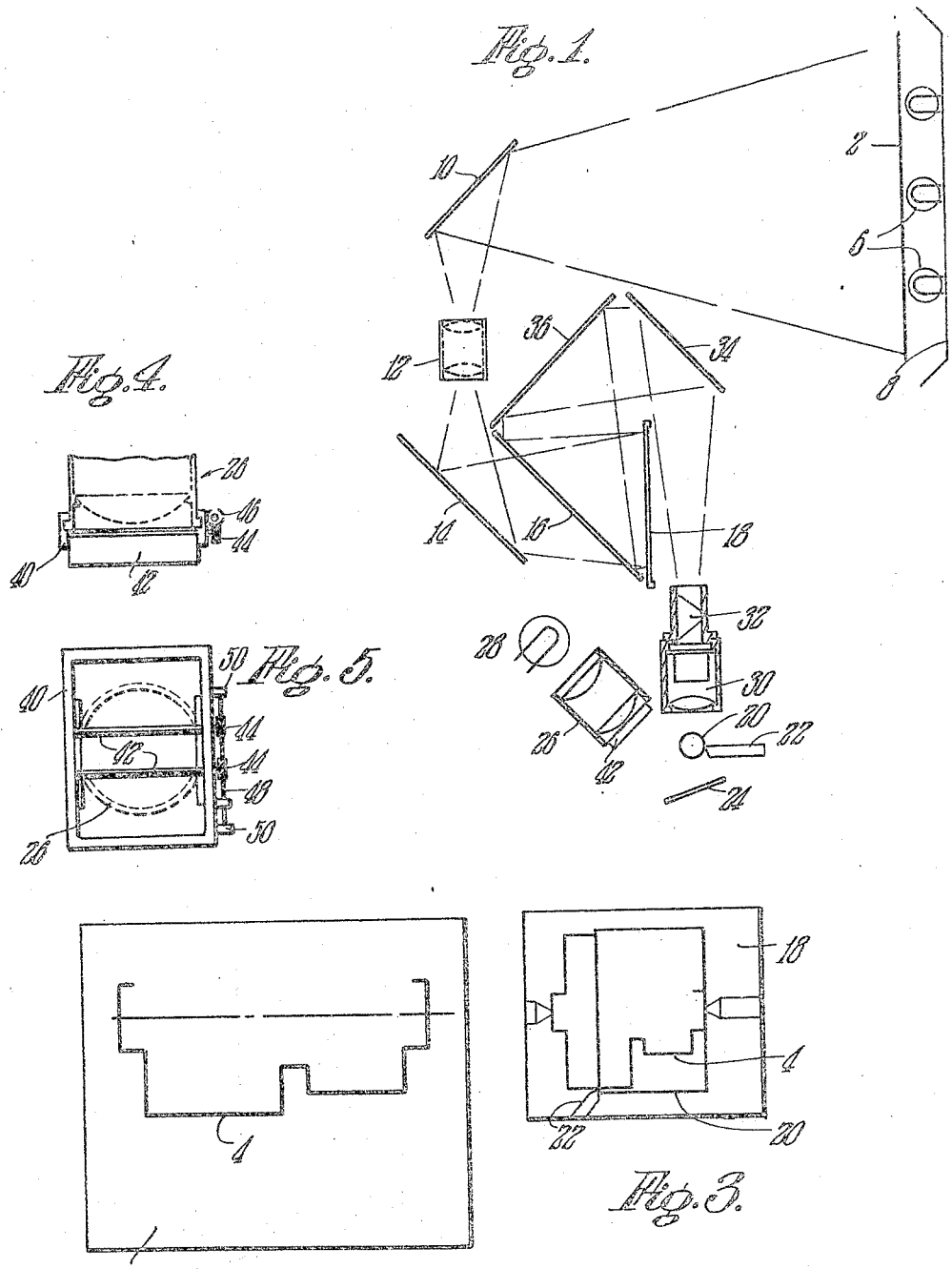

2,489,789

UNITED STATES PATENT OFFICE 2,489,789

PROJECTION APPARATUS FOR OBJECTS IN MACHINING OPERATIONS

Frank D. Korkosz, Chicopee, Mass.

Application February 15, 1946, Serial No. 647,807

1 Claim. (Cl. 88—24)

This invention relates to improvements in apparatus for machining objects and the principal objects of the invention are directed to the provision of an apparatus which is characterized by means for projecting onto a screen in superposed relation the image of a drawing of an object to be produced and the image of the object being produced.

According to special features of the invention a drawing of the object to be produced is arranged to show the object at an enlarged scale while the image thereof is projected onto a screen at a scale reduced therefrom but at a scale greater than the object to be produced. The image of the object being produced is projected onto the screen at an enlarged scale and superposed on the projected image of the drawing. The scale of the image of the drawing and the image of the object are in agreement on the screen and the image of the tool or tools working on the object is projected onto the screen so that its operation may be visualized and the tool is actuated in such a way that its acts on the object to form the same in conformity with the image of the drawing. In this way the object is formed without the measuring operations usually necessary in connection with machining operations.

By providing a drawing of the object to be produced at an enlarged scale and projecting it onto the screen at a scale reduced therefrom but at a scale greater than the object, inaccuracies in the drawing are practically eliminated in the projected image thereof, and by projecting the image of the object and tool at an enlarged scale and superposing the same on the image of the drawing extreme accuracy in the object forming operation is made possible.

The apparatus of the invention is adapted for broad application where it is desired by a machining operation to form an object and it will be understood that machining for the purposes of disclosure includes the usual operations such as grinding, turning, cutting, finishing and the like.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a diagrammatic view showing in a diagrammatic way the components of the apparatus of the invention;

Fig. 2 is a plan view of a drawing of an object which is to be formed from a piece of stock;

Fig. 3 is a plan view of a screen having the projected images of the drawing and of the object being formed thereon;

Fig. 4 is an end elevational view of the lower end of the condenser casing; and

Fig. 5 is an inverted plan view thereof.

Referring now to the drawings more in detail, the invention will be fully described.

A drawing is represented by 2 on which is delineated the object 4 or a part of the object which is to be produced. The drawing will preferably be made at a scale larger than the actual object and said drawing may be made on various materials. As shown, the drawing is illuminated from the rear by plural lights 6 and a reflector 8 and will be made from transparent material. In another way, light may be directed onto the opposite face of the drawing.

The image of the drawing is projected onto a mirror 10 through a lens construction 12 and onto a mirror 14 which directs the image through a transparent or half-silvered mirror 16 onto a transparent screen 18 which may be of ground glass or the like.

The object 4 shown on the drawing and to be produced will be enlarged or shown on the drawing at a scale greater than the object itself thereby eliminating inaccuracies when projected onto the screen at a smaller scale than that of the drawing and larger than that of the object to be produced.

The lens construction 12 will be a projection or process lens adapted to project the drawing accurately without distortion and may take various forms to obtain the desired results.

A piece of stock is represented by 20 from which the object is to be formed and for purposes of description it may be assumed that the same is rotated between centers for the action of a tool 22, as in a lathe.

A mirror 24 is disposed beneath the stock and a condenser construction 26 is provided for directing light rays from a source such as a light bulb 28 onto the mirror 24.

A lens construction is shown at 30 and a prism 32 is provided thereabove. Light rays are directed by the mirror 24 upwardly through the lens construction 30 and prism 32 so as to project the image of the piece of stock or object being formed onto a mirror 34, thence to a mirror 36, and from the latter to half-silvered mirror 16 and onto the screen 18.

The parts are constructed and arranged so that the image of the object being formed is projected onto the screen at an enlarged scale and at a scale agreeing with that of the image of the drawing. Also the parts are arranged so that the images of the drawing and object being formed are in superposed relation on the screen as shown in Fig. 3.

With the images superposed the machining tool such as 22 is moved relative to the piece of stock so as to form the stock into an object having a contour agreeing with the image of the drawing.

The condenser construction will be such in connection with the mirror 24 that the light rays are substantially parallel thereby to project the image of the object being formed without distortion.

The insure of this, a carriage 40 is slidable back and forth on the lower end of the condenser assembly which has a pair of plates 42 pivoted therein. Gears 44 associated with the plates are in mesh with gears 46 of a shaft 48 journalled at 50 in the frame 40.

The carriage may be moved and the plates may be adjusted so as to direct a parallel band of light rays onto the mirror 24 and thereby past a certain portion of the object being formed to insure parallelism of the light rays at some particular portion of the object and eliminate the possibility of distortion of the image of the object.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

An apparatus for guiding in the machining by a cutting tool of an object from a piece of stock, a drawing having delineated thereon the object to be produced at a scale greater than the scale of the actual object to be produced, a light source directed onto said drawing, a primary mirror for receiving the image of the object to be produced, a primary projection lens for receiving the image of the object to be produced from said primary mirror, a secondary mirror for receiving the image of the object to be produced from said primary lens, a transparent mirror for receiving the image of the object to be produced from said secondary mirror, a transparent screen for receiving the image of the object to be produced from said transparent mirror, a fixed mirror disposed adjacent the piece of stock, a light source cooperating with said fixed mirror, a condenser for directing light rays from said light source and shadows formed by the piece of stock onto said fixed mirror, a secondary lens for receiving the light rays and shadows from said fixed mirror, a prism for receiving the light rays and shadows from said secondary lens, a primary prism mirror for receiving the light rays and shadows from said prism, a secondary prism mirror for receiving the light rays and shadows from said primary prism mirror and projecting same onto said transparent mirror for reflection onto said screen, all adapted and arranged whereby the image of the object to be produced may be projected upon said screen at an enlarged scale and at a scale equal to the scale of the image of the drawing projected upon said screen with the image of the object to be produced and the image of the drawing is superposition on said screen whereby a cutting tool may be moved relative to the piece of stock so as to form the stock into an object having a contour agreeing with the contour on the image of the drawing.

FRANK D. KORKOSZ.

REFERENCES CITED

The following references are of record in the file of this patent:

UNITED STATES PATENTS

| Number | Name | Date |
| --- | --- | --- |
| 1,801,200 | Howell | Apr. 15, 1931 |
| 2,061,378 | Henze et al. | Nov. 17, 1936 |
| 2,155,248 | Adams | Apr. 18, 1939 |
| 2,192,529 | Thomas et al. | Mar. 5, 1940 |
| 2,197,308 | Kolb et al. | Apr. 16, 1940 |
| 2,203,389 | Kurtz | June 4, 1940 |
| 2,249,121 | Drescher | July 15, 1941 |
| 2,334,962 | Seitz | Nov. 23, 1943 |
| 2,360,772 | Hedin | Oct. 17, 1944 |
| 2,406,451 | Borkenstein | Aug. 27, 1946 |